United States Patent [19]

Kim

[11] Patent Number: 5,159,252

[45] Date of Patent: Oct. 27, 1992

[54] APPARATUS AND METHOD FOR EXPANDING AND CONTROLLING THE MULTIFUNCTION MECHAPOSITION

[75] Inventor: Kyung-su Kim, Kyunggi, Rep. of Korea

[73] Assignee: SamSung Electronics Co., Ltd., Kyung Ki, Rep. of Korea

[21] Appl. No.: 491,599

[22] Filed: Mar. 12, 1990

[30] Foreign Application Priority Data

Oct. 12, 1989 [KR] Rep. of Korea ............... 89-14647

[51] Int. Cl.$^5$ .................. G05B 19/06; H04N 5/783
[52] U.S. Cl. .................. 318/578; 318/560; 360/10.3; 360/33.1; 455/181
[58] Field of Search .............. 318/6, 11, 265, 467, 318/685, 696, 578, 560; 360/27, 69, 71, 72.1, 72.3, 74.1, 73.05, 73.08, 14.3, 13, 10.3, 33.1; 455/181, 166; 358/194.1; 200/6 BB, 11 E, 11 G, 11 R, 11 TC, DIG. 34

[56] References Cited

U.S. PATENT DOCUMENTS

| | | | |
|---|---|---|---|
| 3,569,839 | 3/1971 | Dyer | 455/181 X |
| 4,045,777 | 8/1977 | Micrzwinski et al. | 340/168 B |
| 4,355,415 | 10/1982 | George et al. | 455/166 X |
| 4,428,005 | 1/1984 | Kubo | 360/10.3 |

*Primary Examiner*—Paul Ip
*Attorney, Agent, or Firm*—Robert E. Bushnell

[57] ABSTRACT

A multifunction mechaposition expanding controlling apparatus and method thereof are provided which can expand and control the mechaposition according to the number of the function as many as the desired numbers by rotating, above 360°, having the program switch of a rotary type of the multifunction electronic machineries having a deck.

The apparatus comprises a microcomputer, a capstan motor and a loading motor, a program switch of a rotary type, a deck and a motor driving portion.

7 Claims, 4 Drawing Sheets

APPARATUS AND METHOD FOR EXPANDING AND CONTROLLING THE MULTIFUNCTION MECHAPOSITION

FIELD OF THE INVENTION

The present invention relates to a multifunction control in electronic machinery having a deck, and particularly to apparatus and method thereof which can perform control by expanding states of a tape-handling mechanism (i.e. mecha position or mechanical position) for the multiple functions.

BACKGROUND OF THE INVENTION

In general, there is a video tape recorder, a digital audio tape recorder, a camcorder and a robot, etc, all of which are electronic machinery having a deck, and these examples of electronic machinery control a mechanism by the input of a sensor.

Recently, besides an original function, the accompanying manifold functions for the convenience of users are being appended to electric machinery having a deck and, in order to detect a state of a tape-handling mechanism corresponding to these accompanying manifold functions, a program switch tends to be used instead of many sensors.

Such a program switch is classified into a slide type and a rotary type.

Of these types, since the program switch of a rotary type operated by the electric power of a loading motor can detect the more accurate states of the tape-handling mechanism (i.e., the "mechaposition") than the program switch of a slide type, the program switch of a slide type is being replaced by the program switch of a rotary type.

However, since the prior program switch of a rotary type can rotate only within 360° due to the double detection of the same mechaposition, the kinds of mechaposition can not be diversified so that the mecha condition suitable for the multiple function modes can not be established.

SUMMARY OF THE INVENTION

It is an object of the present invention to provide a controlling apparatus for extending the multifunction mechaposition and a method thereof which can control the function of their mechanism by extending the multifunction mechaposition of electronic machinery having a deck.

To accomplish these and other objects, an apparatus of the present invention may be characterized by:

a microcomputer for controlling a system;

a loading motor and a capstanmotor for making the recorded interval of a recording medium run;

a program switch of a rotary type having the multiple detecting contact plates for supplying multiple logic signals, which have different logic values according to each position to the microcomputer by being operated by the loading motor;

a deck having a starting and ending sensor for supplying to the microcomputer by detecting the ending and starting point of a tape; and a motor driving portion for driving a variety of motors within the deck under the control of the microcomputer.

Also, in order to achieve these and other objects, a method of the present invention may be characterized by as:

a position check process in which a microcomputer checks where a mechaposition is located among a still position, a pinch roller-in (hereinafter "P-IN") position, a regeneration position, a picture still position, an operation stop position, a reverse picture search (hereinafter "REV") position, an unloading position, a short forward/rewind (hereinafter "short F/R") position, an eject position and a fast forward/rewind (hereinafter "FF/REW") position in the state of the capstan motor and loading motor which are rotating forward;

a first position convert process in which a microcomputer converts the present position into an unloading position when a mechaposition is at a still position, a P-IN position or a regeneration position, a picture still position or an operation stop position, or a REV position during the position check process;

an initializing confirm process in which a microcomputer stop a loading motor and a capstan motor by controlling a motor driving portion when a mechaposition is at an unloading position during the position check process;

a second position convert process in which a microcomputer converts the present position into an eject position when a mechaposition is at a short F/R position during the position check process;

a first imaginary or false position search process in which a microcomputer checks whether the present detected eject position is false and, false, the first position convert process is performed when a mechaposition is at a withdrawal position during the position check process; and a second imaginary or false search process in which a microcomputer checks whether the present detected FF/REW position is imaginary and, if it is imaginary, the first position convert process is performed and, if it is genuine the second position convert process is performed when a mechaposition is at a FF/REW position during the position check process.

The above objects and other advantages of the present invention will become more apparent by describing the preferred embodiment of the present invention with reference to the attached drawings.

DETAILED DESCRIPTION OF THE PREFERRED EMBODIMENT OF THE INVENTION

Figure 1:
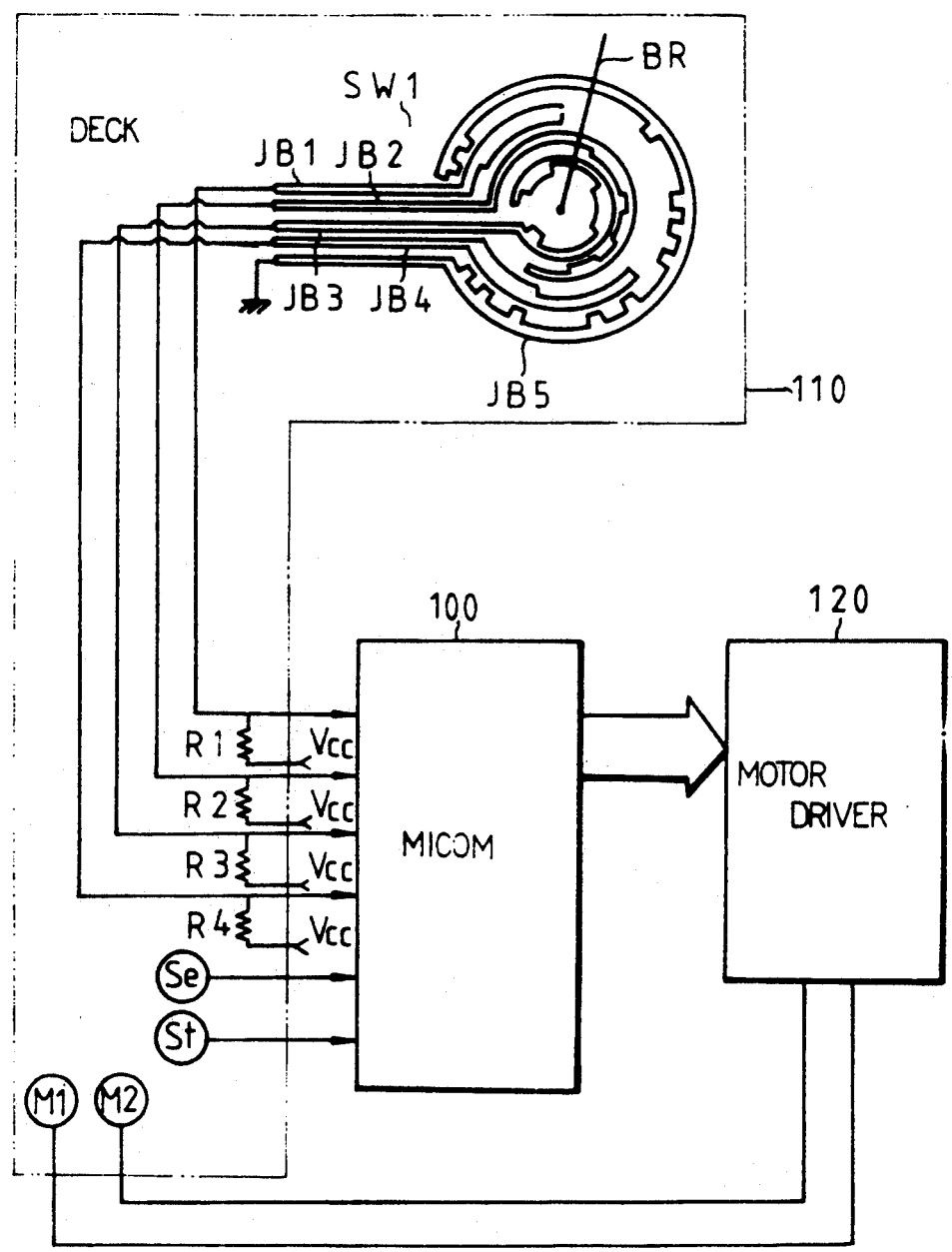
FIG. 1 is a system-diagram of one embodiment of the present invention.

FIG. 1 is a system diagram of the present invention.

The embodiment shown in FIG. 1 has a microcomputer 100 for controlling a system, a loading motor M2 and a capstan motor 1 for the traveling of a system, a program switch of a rotary type SW1 having the multiple detecting contact plates for supplying the multiple logic signals which have different logic values according to each position to microcomputer 100 by being operated by the loading motor M2, a deck 110 having a starting and ending sensor St, Se for supplying microcomputer 100 by detecting the ending and starting point of a tape, and a motor driving portion 120 for driving a variety of motors within deck 110 under the control of microcomputer 100.

In FIG. 1, microcomputer 100 senses mechaposition by the sensing signals which are inputted from deck 110, and next, controls the mechaposition of a deck corresponding to the function by operating motors within deck 110.

Then, deck 110 senses the mechaposition which is running by the program switch of a rotary type SW1 and the starting and ending sensors St, Se within itself and the running state of a tape, and supplies the results to microcomputer 100, and also, makes a mechaposition maintained in a variety of motors which are operated by the driving signal of a motor driving portion 120.

A program switch of a rotary type SW1 included within deck 110 comprises a brush BR which is rotated by a loading motor, four position detecting contact plates JB1 to JB4 and a common ground connecting contact plate JB5, and the four position detecting contact plates JB1 to JB4 have multiple salient contact points respectively, in order to be able to detect a mechaposition having different logic values of maximum 16 according to the rotating of a brush above 360°, and a common ground connecting contact plate JB5 has salient contact points corresponding to the number of the mechapositions which can be detected.

Figure 3:
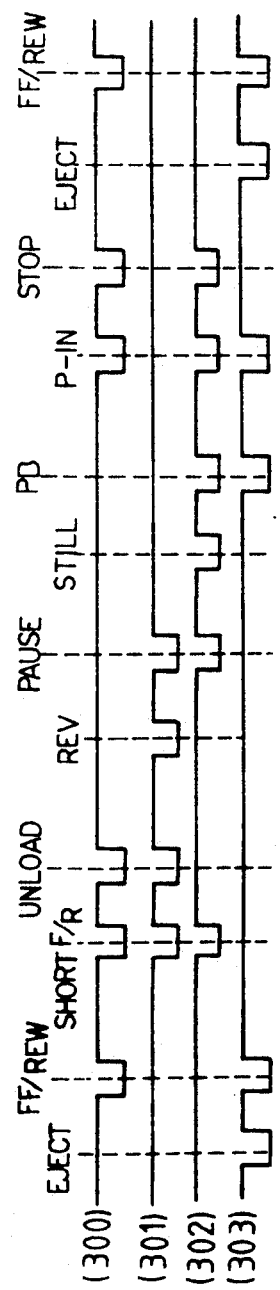
FIG. 3 is an output waveform corresponding to each contact of a program switch according to the present invention.

The four position detecting contact plates JB1 to JB4 supply such logic signals as 300 to 303 in FIG. 3, to microcomputer 100 as they are opened or conducted to the common ground connecting contact plate JB5 according to the rotating of their respective brush, and among the plates, the detecting contact plate JB1 supplies such a logic signal as 300 in FIG. 3, the detecting contact plate JB3 such a logic signal as 301 in FIG. 3, the detecting contact plate JB4 such a logic signal as 303 in FIG. 3, within microcomputer 100.

Then, the starting and ending sensors St,Se which are set up in deck 110 supply a sensing signal to microcomputer 100 by sensing whether a tape is at the starting point or at the ending point.

A motor driving portion 120 connected between microcomputer 100 and deck 110 drives a variety of motors within the deck by the controlling signal which is inputted from microcomputer 100.

Additionally, deck 110 has a variety of motors, for example, a capstan motor M1 and a loading motor, etc. within itself, and has many apparatuses and others but, having no relation to the present invention, many of the apparatuses within deck 110 are not shown in the drawings.

Figure 2A:
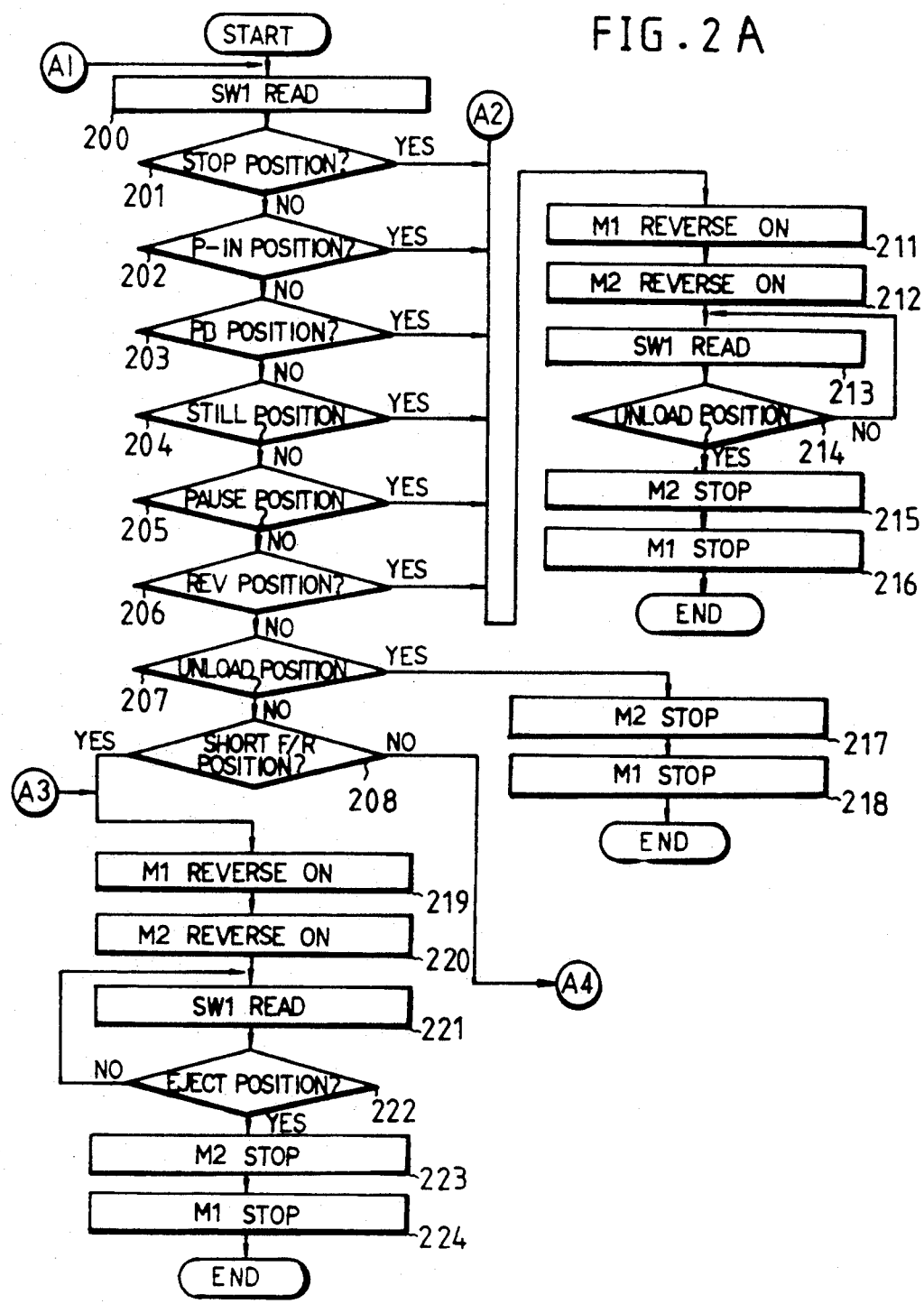
FIGS. 2A and 2B are flow charts for the embodiment of the present invention.
Figure 2B:
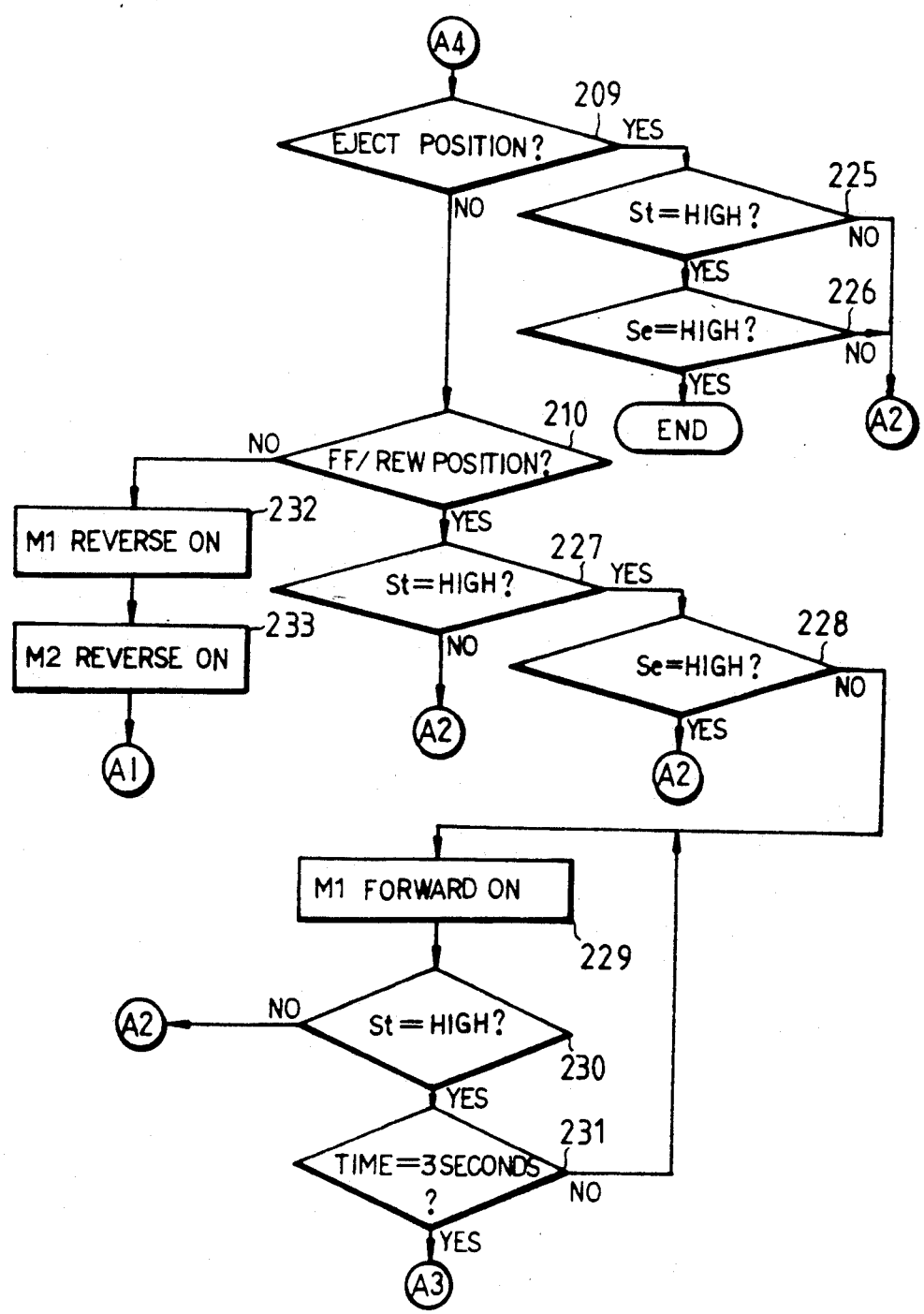

FIGS. 1A and 2B and flow charts which are performed by microcomputer 100 of the circuit diagram shown in FIG. 1 according to the present invention.

FIGS. 2A and 2B comprises a position check process in which microcomputer 100 checks where a mechaposition is located according to the output of the program switch of a rotary type among a still position, a P-IN position, regeneration position, a picture still position, an operation stop position, a REV position, an unloading position, a short F/R position, an eject position and a FF/REW position when a power source in 'ON';

a first position convert process in which microcomputer 100 converts the present position into an unloading position when a mechaposition is at a still position, a P-IN position or a regeneration position, a picture still position or an operation stop position, or a REV position during the position check process;

an initializing confirm process in which microcomputer 100 stops a loading motor M2 and a capstan motor M1 by controlling a motor driving portion when a mechaposition is at an unloading position during the position check process;

a second position convert process in which microcomputer 100 converts the present position into an eject position when a mechaposition is at a short F/R position during the position check process;

a first imaginary position search process in which microcomputer 10 checks whether the present detected eject position is false and, if it is false, the first position convert process is performed when a mechaposition is at an eject position during the position check process; and a second imaginary position search process in which a microcomputer checks whether the present detected FF/REW position is imaginary and if it is imaginary, the first position convert process is performed and, if it is genuine, the second position convert process is performed when a mechaposition is at a FF/REW position during the position check process.

In FIGS. 2A and 2B, when an initial power source is "ON", in the state of a capstan motor M1 and a loading motor M2 rotating forwardly, microcomputer 100 leads the logic signals on the contact plates JB1 to JB4 of the program switch of a rotary type within deck 110 in step 200 and next, where a mechaposition is positioned among a still position, a P-IN position, a regeneration position, a picture still position, an operation stop position, a REV position, an unloading position, a short F/R position, an eject position and a FF/REW position is checked by the logic value which is determined by the LED logic signals in steps 201 to 210.

Among steps 201 to 210, when in a still position, a P-IN position or a regeneration position, a picture still position or an operation stop position or a REW position, after microcomputer 100 controls motor driving portion 120 and rotates the capstan motor M1 and the loading motor M2 within deck 110 reversely in steps 211, 212 and next, leads the logic signals on the contact plates JB1 to JB4 for the detection of the program switch SW1 of a rotary type within deck 110, in step 213, whether the LED logic signals are in an unloading position or not is checked by the designated logic value and, if the LED logic signals are not in an unloading position, the microcomputer is returned to steps 213, steps 214.

In step 214, if the LED logic signals are in an unloading position, microcomputer 100 controls motor driving portion 120 and stops the loading motor M2 and the capstan motor M1 which are built within deck 110, in turn, by controlling motor driving portion 120, in steps 215, 216.

Consequently, steps 211 to 216 are the processes which are unloading for a tape not to be untied.

In steps 201 to 210, if the LED logic signals are in an unloading position, microcomputer 100 controls motor driving portion 120 and stops the loading motor M2 and the capstan motor M1 which are built within deck 110, in order, in steps 217, 218.

In steps 201 to 210, when in a short F/R position, microcomputer 100 controls motor driving portion 120 and rotates reversely the capstan motor M1 and the loading motor M2 which are built within deck 110 and are rotating forward, in order, in steps 219, 220.

After performing step 220, microcomputer 100 leads the logic signals on the detecting contact plates of the program switch of a rotary type SW1 within deck 100, and stands by until the LED logic signals are in an eject position by checking the designated logic value, in step 222.

In step 222, when the LED logic signals are in an eject position, microcomputer 100 controls motor driving portion 120 and stops the loading motor M2 and the capstan motor M1 which are built within deck 110 and are rotating reversely, in order, in steps 223, 224.

Consequently, steps 219 to 224 are the processes which convert the present mechaposition into an eject position.

In steps 201 to 210, when in an eject position, microcomputer 100 checks whether the starting sensing signal of a high logic state is inputted from the starting sensor St which is built within deck 110, and judges whether a tape is at the starting point, in step 225.

In the 225 step, when a tape is at the starting point, a microcomputer 100 checks whether the ending sensing signal of a high logic state is inputted from the ending sensor Se which is built within a deck 110, in a step 226.

In step 226, when an ending sensing signal of high logic state is inputted, a microcomputer 100 ends an initializing operation and, on the other hand, in step 225, when a starting sensing signal of a high logic state is not inputted and, in step 226, when an ending sensing signal of a high logic state is not inputted, microcomputer 100 is returned to step 211.

Namely, steps 225, 226 are the processes checking whether an eject position is a genuine position or an imaginary position, and, if it is a genuine eject position, microcomputer 100 finishes an initializing operation and, if it is an imaginary eject position, microcomputer 100 is returned to the unloading process.

In steps 201-210, when in a FF/REW position, microcomputer 100 checks whether the starting sensing signal of a high logic state is inputted from the starting sensor St which is built within deck 110, in step 227.

In step 227, when the sensing signal of a high logic state is inputted, microcomputer 100 checks whether the ending sensing signal of a high logic state is inputted from the ending sensor Se which is built within deck 110, in step 228.

In step 228 when the ending sensing signal of a high logic state is not inputted, microcomputer 100, controls motor driving portion 120 during the fixed time, for example, 3 seconds and rotating forward the capstan motor M1 which is built within deck 110, checks whether the starting sensing signal of a high logic state is inputted from the starting sensor Se within deck 110, in steps 229 to 231.

In steps 229 to 321, when the starting sensing signal is inputted, microcomputer 100 performs step 227.

In steps 229 to 231, when the starting sensing signal of a high logic state is not inputted at step 227 or the ending sensing signal of a high logic state is inputted at step 228, microcomputer 100 performs step 211.

Consequently, steps 227 to 231 judge whether a FF/REW position is a genuine position or an imaginary position and, if it is a genuine FF/REW position, microcomputer 100 goes to the process which converts to the eject position and; if it is an imaginary FF/REW position, microcomputer 100 goes to the process which converts to the unloading position.

When a mechaposition is not set at steps 201 to 210, microcomputer 100 controls motor driving portion 120 and rotates reversely the capstan motor M1 and the loading motor M2 within the deck, in order, and next, is returned to step 200.

Steps 225 to 231 are the processes for distinguishing the imaginary eject position and the imaginary FF/REW position from the genuine eject position and the genuine FF/REW position which are detected doubly due to the rotating of the brush BR on the program switch of a rotary type above 360°.

As described above, the present invention can expand and control the mechaposition according to the number of the functions as many as the desired numbers by rotating, above 360°, the program switch of a rotary type of the multifunction electronic machineries having a deck.

What is claimed is:

1. An apparatus, for expanding and controlling multifunctional states of a recording medium-handling mechanism in a multifunctional electronic using a machinery recording medium, said apparatus comprising:

a microcomputer for controlling a recorder system;

a capstan motor and a loading motor for making a recorder interval of a recording medium run;

a rotary type program switch including multiple detecting contact plates for supplying multiple logic signals having different logic values according to respective positions contacted and checked by a brush rotated by said loading motor to said microcomputer, the brush being connected to the program switch;

a deck including a starting sensor and an ending sensor for detecting starting and ending points of the recording medium, and supplying detection signals to said microcomputer, and motor driving means for driving said motors under the control of said microcomputer, whereby said microcomputer instructs said motor driving means according to the output logic value of said program switch of a rotary type and said detection signals of said starting and ending sensors to control said capstan motor and said loading motor.

2. An apparatus as claimed in claim 1, wherein each of said detecting contact plates of said program switch comprise multiple salient contact points so that said detecting contact plates enable said different logic values to be output according to each of said respective positions contacted by said brush as said brush rotates.

3. An apparatus as claimed in claim 1, wherein the brush of said program switch has a rotating angle greater than 360 degrees (360°) for selecting functions not available during the rotating angle between 0° and 360°.

4. A method for expanding and controlling multifunctional states of recording medium-handling mechanism having a microcomputer for controlling a recording system, a deck which includes a rotary type program switch, a capstan motor, a starting sensor, an ending sensor, said starting and ending sensors detecting starting and ending points of the recording medium, a loading motor, and a motor driving portion, comprising the steps of:

a position check process in which said microcomputer checks where the present state of the mechanism is located among multiple states of the mechanism according to output logic values of said program switch and output logic values of said starting and ending sensors; and a position convert process in which said microcomputer converts the present state of the mechanism into a next state of the mechanism according to each state of the mechanism by driving the capstan motor and the loading motor within said deck by said motor driving portion after said position check process is performed.

5. A method as claimed in claim 4, wherein the multifunctional states of the mechanisms comprise a pause position, a pinch roller driving position, a playback position, a picture still position, an operation stop position, a REV position, an unload position, a short F/R position, an eject position and a FF/REW position.

6. A method as claimed in claim 4, wherein said position convert process includes;
 a first position convert process in which said microcomputer converts the present position into the unload position when a state of the mechanism is at a pause position, a pinch roller driving position, a playback position, a picture still position, an operation stop position or a REW position during said position check process;
 an initializing confirm process in which said microcomputer instructs said motor driving portion to stop the loading motor and the capstan motor when a state of the mechanism is said unload position during said position check process;
 a second position convert process in which said microcomputer converts the present position into an eject position when a state of the mechanism is at a short F/R position during said position check process;
 a first false position check process in which said microcomputer checks whether the present position is an eject position and checks whether said eject position is a false position and, in case of being false, performs said first position convert process; and
 a second false position check process in which said microcomputer checks whether the present position is an FF/REW position and checks whether said FF/REW position is a false position and, in case of being false, performs said second position convert process and, in case of being true, performs said first position convert process.

7. A method for expanding and controlling multifunctional states of recording medium-handling mechanism having a microcomputer for controlling a recording system, a deck which includes a rotary type program switch, a capstan motor, a starting sensor, an ending sensor, a loading motor, and a motor driving portion, comprising the steps of;
 a position check process in which said microcomputer checks where the present state of the mechanism is located among multiple states of the mechanism according to output logic values of said program switch; and
 a position convert process in which said microcomputer converts the present state of the mechanism into a next state of the mechanism according to each state of the mechanism by driving the capstan motor and the loading motor within said deck by said motor driving portion after said position check process is performed, wherein said position convert process includes:
 a first position convert process in which said microcomputer converts the present position into the unload position when a state of the mechanism is at a pause position, a pinch roller driving position, a playback position, a picture still position, an operation stop position or a REW position during said position check process;
 an initializing confirm process in which said microcomputer instructs said motor driving portion to stop the loading motor and the capstan motor when a state of the mechanism is said unload position during dais position check process;
 a second position convert process in which said microcomputer converts the present position into an eject position when a state of the mechanism is at a short F/R position during said position check process;
 a first false position check process in which said microcomputer checks whether the present position is an eject position and checks whether said eject position is a false position and, in case of being false, performs said first position convert process; and
 a second false position check process in which said microcomputer checks whether the present position is an FF/REW position and checks whether said FF/REW position is a false position and, in case of being false, performs said second position convert process and, in case of being true, performs said first position convert process.

* * * * *

UNITED STATES PATENT AND TRADEMARK OFFICE
CERTIFICATE OF CORRECTION

PATENT NO. : 5,159,252  
DATED : 27 October 1992  
INVENTOR(S) : Kyung- Su Kim

It is certified that error appears in the above-indentified patent and that said Letters Patent is hereby corrected as shown below:

| | |
|---|---|
| Column 1, Line 58 | after "having" delete "the"; |
| Column 2, Line 3 | Before "as" delete "by"; |
| Line 21 | After "microcomputer" change "stop" to --stops--; |
| Line 31 | after "and," insert --if it is--; |
| Line 35 | after "false" insert --position--; |

UNITED STATES PATENT AND TRADEMARK OFFICE
CERTIFICATE OF CORRECTION

PATENT NO. : 5,159,252  
DATED : October 27, 1992  
INVENTOR(S) : Kyung-Su-Kim

It is certified that error appears in the above-indentified patent and that said Letters Patent is hereby corrected as shown below:

| | |
|---|---|
| Column 3, Line 29 | before "mechapositions" delete "the"; |
| Column 4, Line 50 | before "214" delete "steps"; |
| Column 5, Line 25 | before "microcomputer" delete "a"; |
| | IN THE CLAIMS |
| Column 8, Line 3 | after "of" change ";" to --:--: |

Signed and Sealed this

Fifteenth Day of October, 1996

Attest:

BRUCE LEHMAN

*Attesting Officer*   *Commissioner of Patents and Trademarks*